(12) United States Patent
Kamioka et al.

(10) Patent No.: US 7,985,010 B2
(45) Date of Patent: Jul. 26, 2011

(54) SYSTEM FOR CONTROLLING LIGHT QUANTITY OF HEADLIGHT

(75) Inventors: Takahiro Kamioka, Kariya (JP);
Atsushi Yamamoto, Nagoya (JP);
Yasutoshi Horii, Nagoya (JP)

(73) Assignee: Denso Corporation, Kariya (JP)

( * ) Notice: Subject to any disclaimer, the term of this patent is extended or adjusted under 35 U.S.C. 154(b) by 201 days.

(21) Appl. No.: 12/238,769

(22) Filed: Sep. 26, 2008

(65) Prior Publication Data

US 2009/0086497 A1    Apr. 2, 2009

(30) Foreign Application Priority Data

Sep. 27, 2007  (JP) ................................. 2007-251734

(51) Int. Cl.
*B60Q 1/00* (2006.01)
*F21V 1/00* (2006.01)
*F21V 17/02* (2006.01)

(52) U.S. Cl. ........................ 362/465; 362/466; 362/512

(58) Field of Classification Search .................. 362/460, 362/464, 465, 466, 512; 340/458, 459, 648, 340/649; 315/76–83
See application file for complete search history.

(56) References Cited

U.S. PATENT DOCUMENTS

| | | | | |
|---|---|---|---|---|
| 4,037,197 A | * | 7/1977 | Courty ........................... | 340/468 |
| 4,891,559 A | * | 1/1990 | Matsumoto et al. ............ | 315/82 |
| 4,989,121 A | * | 1/1991 | Hall .............................. | 362/540 |
| 5,347,261 A | * | 9/1994 | Adell ........................... | 340/469 |
| 6,275,145 B1 | * | 8/2001 | Rogozinski ................ | 340/425.5 |
| 6,429,594 B1 | * | 8/2002 | Stam et al. ..................... | 315/82 |
| 6,550,944 B2 | * | 4/2003 | Kusagaya ..................... | 362/466 |
| 6,966,675 B2 | | 11/2005 | Albou | |
| 7,092,007 B2 | * | 8/2006 | Eguchi et al. ................. | 348/148 |
| 7,199,767 B2 | * | 4/2007 | Spero .............................. | 345/7 |
| 7,227,459 B2 | * | 6/2007 | Bos et al. ....................... | 340/461 |
| 2004/0114921 A1 | * | 6/2004 | Braun et al. .................. | 396/661 |
| 2006/0202812 A1 | * | 9/2006 | Satoh ............................ | 340/468 |

FOREIGN PATENT DOCUMENTS

| | | | |
|---|---|---|---|
| EP | 1767401 A2 | * | 3/2007 |
| JP | H06-270733 | | 9/1994 |
| JP | H07-021803 | | 1/1995 |
| JP | 08-221700 | | 8/1996 |
| JP | 2001-026236 | | 1/2001 |
| JP | 2003260933 A | * | 9/2003 |
| JP | 2003-335171 | | 11/2003 |
| JP | 2004-207235 | | 7/2004 |
| JP | 2007-227202 | | 9/2007 |

OTHER PUBLICATIONS

Machine Translation of JP 2003-260933 from JPO website.*

(Continued)

*Primary Examiner* — Jong-Suk (James) Lee
*Assistant Examiner* — David R Crowe
(74) *Attorney, Agent, or Firm* — Nixon & Vanderhye P.C.

(57) ABSTRACT

In a system for controlling a headlight of a vehicle to be controlled, a dazzling level determiner determines a parameter value of a dazzling level of a driver of an other vehicle ahead of the controlled vehicle based on information associated with a relative positional relationship between the controlled vehicle and the other vehicle. The dazzling level represents a possibility that the driver of the other vehicle feels dazzling to light irradiated from the headlight of the controlled vehicle. A light-quantity adjuster adjusts a quantity of light to be irradiated from the headlight of the controlled vehicle based on the determined parameter value of the dazzling level.

20 Claims, 9 Drawing Sheets

OTHER PUBLICATIONS

Japanese Office Action dated Nov. 10, 2009, issued in corresponding Japanese Application No. 2007-251734, with English translation.

Japanese Office Action dated Aug. 18, 2009, issued in corresponding Japanese Application No. 2007-251734, with English translation.

* cited by examiner

PARALLELED LIGHT BEAMS

OPTICAL AXIS DIRECTION OF LAMP

PARALLELED LIGHT BEAMS

OPTICAL AXIS DIRECTION OF LAMP

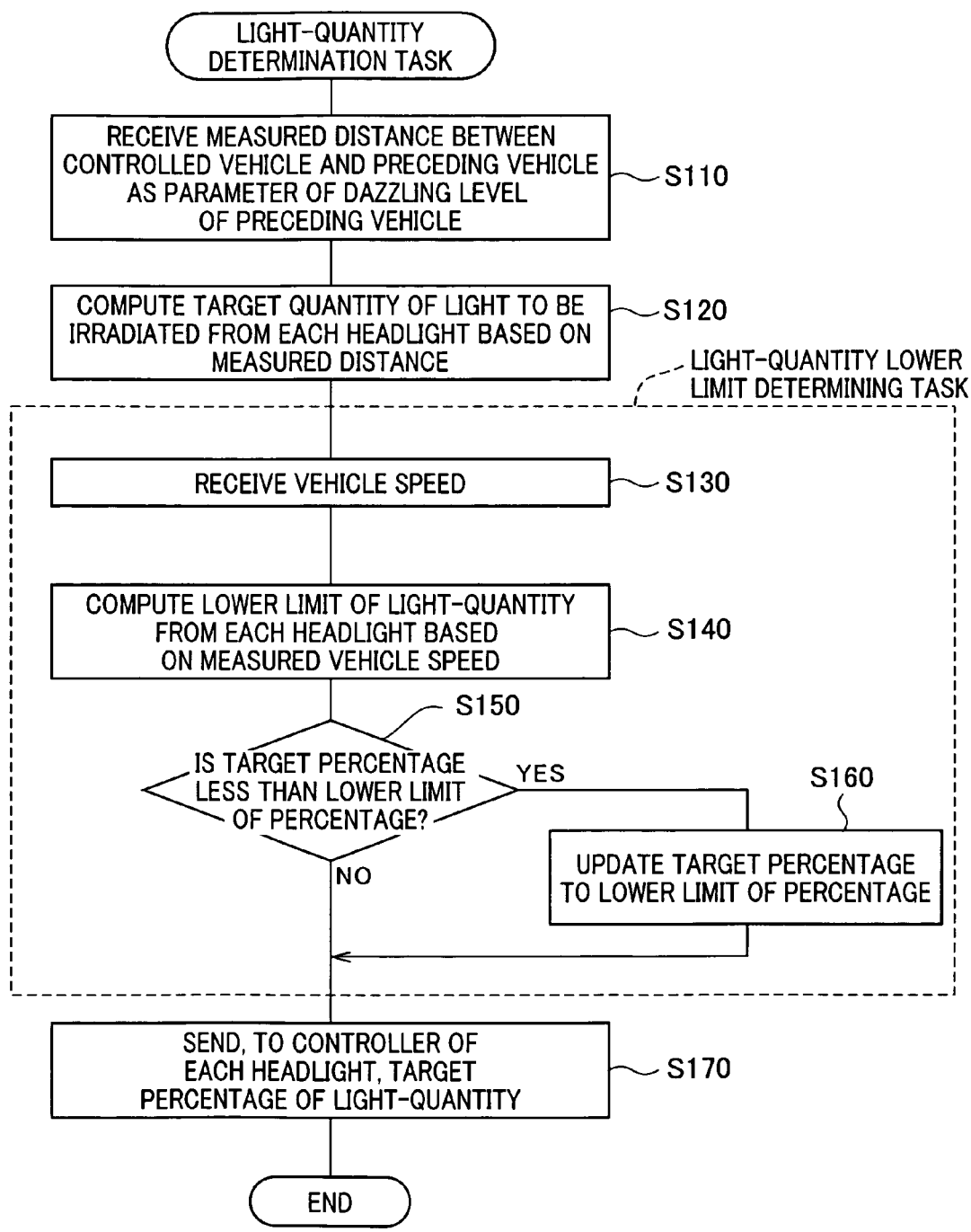

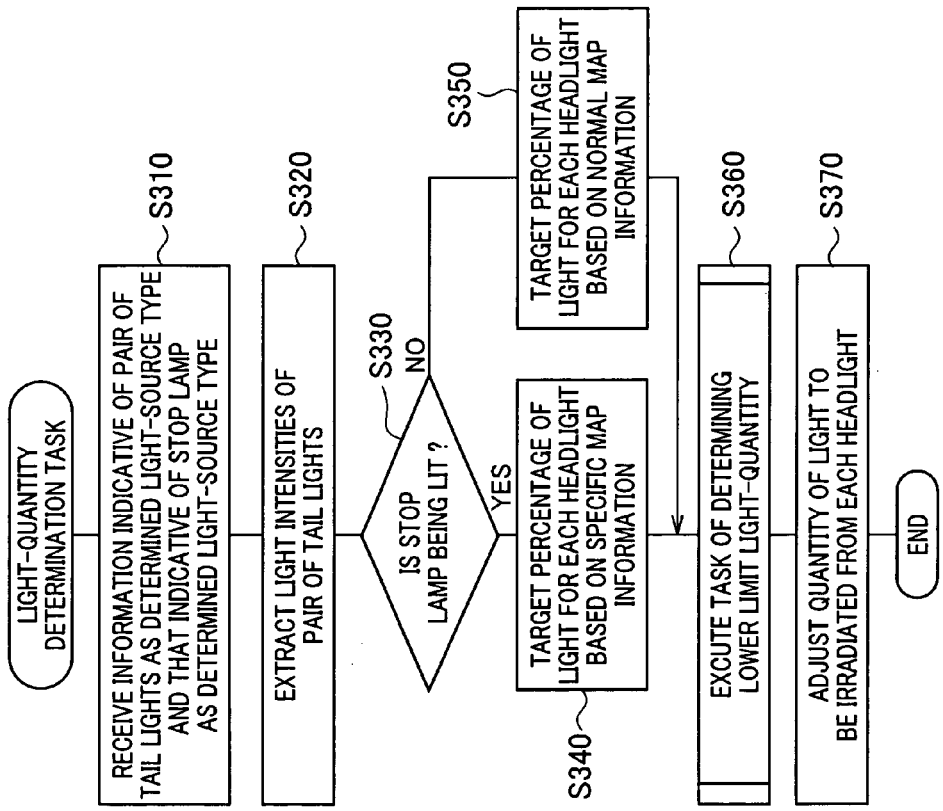
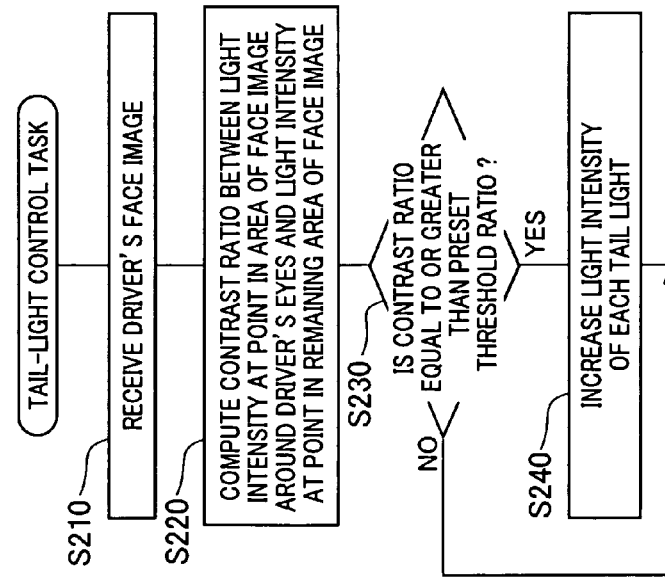

SYSTEM FOR CONTROLLING LIGHT QUANTITY OF HEADLIGHT

CROSS REFERENCE TO RELATED APPLICATIONS

This application is based on Japanese Patent Application 2007-251734 filed on Sep. 27, 2007. This application claims the benefit of priority from the Japanese Patent Application, so that the descriptions of which are all incorporated herein by reference.

FIELD OF THE INVENTION

The present invention relates to systems for controlling an amount of light irradiated by a headlight of a vehicle.

BACKGROUND OF THE INVENTION

There are conventional headlight control systems designed to control light distribution of a headlight of a vehicle to be controlled. Such headlight control systems aim at preventing dazzling of the driver of a preceding vehicle.

An example of such headlight control systems is disclosed in Japanese Patent Application Publication No. H06-270733. The headlight control system disclosed in the above-identified Patent Application Publication is installed in a vehicle to be controlled and is designed to control a light beam irradiated from each of paired headlights within a predetermined light-distribution range. The light-distribution range can be changed by adjusting a direction of the light beam irradiated from each headlight.

The headlight control system is equipped with an actuator having a shade member, such as a shade cam.

The shade member is fixed to a rotary shaft to be rotatable therewith by the actuator. The rotary shaft is disposed ahead of a headlamp of each headlight of the controlled vehicle and in the vehicle width direction. Rotation of the shade member together with the rotary shaft allows part of a light beam irradiated from the headlamp to be cut off. This allows a non-irradiated region to be formed within the light-distribution range.

The headlight control system is also equipped with a controller for controlling the actuator. The controller works to control a rotational position of the cam member through the actuator to thereby change the non-irradiated region depending on a measured distance between the controlled vehicle and a preceding vehicle. The change of the non-irradiated region depending on the measured distance between the controlled vehicle and the preceding vehicle prevents the light beam outputted from each headlight from being irradiated on the preceding vehicle.

The headlight control system however increases the difference in light-quantity (brightness) between an irradiated region and the non-irradiated region within the light-distribution range. This provides poor viewability of the non-irradiated region to the driver of the controlled vehicle, resulting in that it may be difficult for the driver of the controlled vehicle to visibly identity roadside objects located within the non-irradiated region, such as signboards.

SUMMARY OF THE INVENTION

In view of the circumstances set force above, an object of an aspect of the present invention is to provide systems for controlling an amount of light irradiated from a headlight of a vehicle to be controlled; these systems are capable of reducing dazzling of a driver of another vehicle ahead of the controlled vehicle while allowing a driver of the controlled vehicle to visibly identity roadside objects.

According to one aspect of the present invention, there is provided a system for controlling a headlight of a vehicle to be controlled. The system includes a dazzling level determiner configured to determine a parameter value of a dazzling level of a driver of an other vehicle ahead of the controlled vehicle based on information associated with a relative positional relationship between the controlled vehicle and the other vehicle. The dazzling level represents a possibility that the driver of the other vehicle feels dazzling to light irradiated from the headlight of the controlled vehicle. The system includes a light-quantity adjuster configured to adjust a quantity of light to be irradiated from the headlight of the controlled vehicle based on the determined parameter value of the dazzling level.

BRIEF DESCRIPTION OF THE DRAWINGS

Other objects and aspects of the invention will become apparent from the following description of embodiments with reference to the accompanying drawings in which:

FIG. 3A is a flowchart schematically illustrating a light-quantity determination task to be executed by a light-control parameter processor illustrated in FIG. 1;

FIG. 6A is a flowchart schematically illustrating an example of a tail-light control task to be executed by the light-control parameter processor illustrated in FIG. 5;

FIG. 6B is a flowchart schematically illustrating an example of a light-quantity determination task to be executed by the light-control parameter processor illustrated in FIG. 5;

Figure 1:
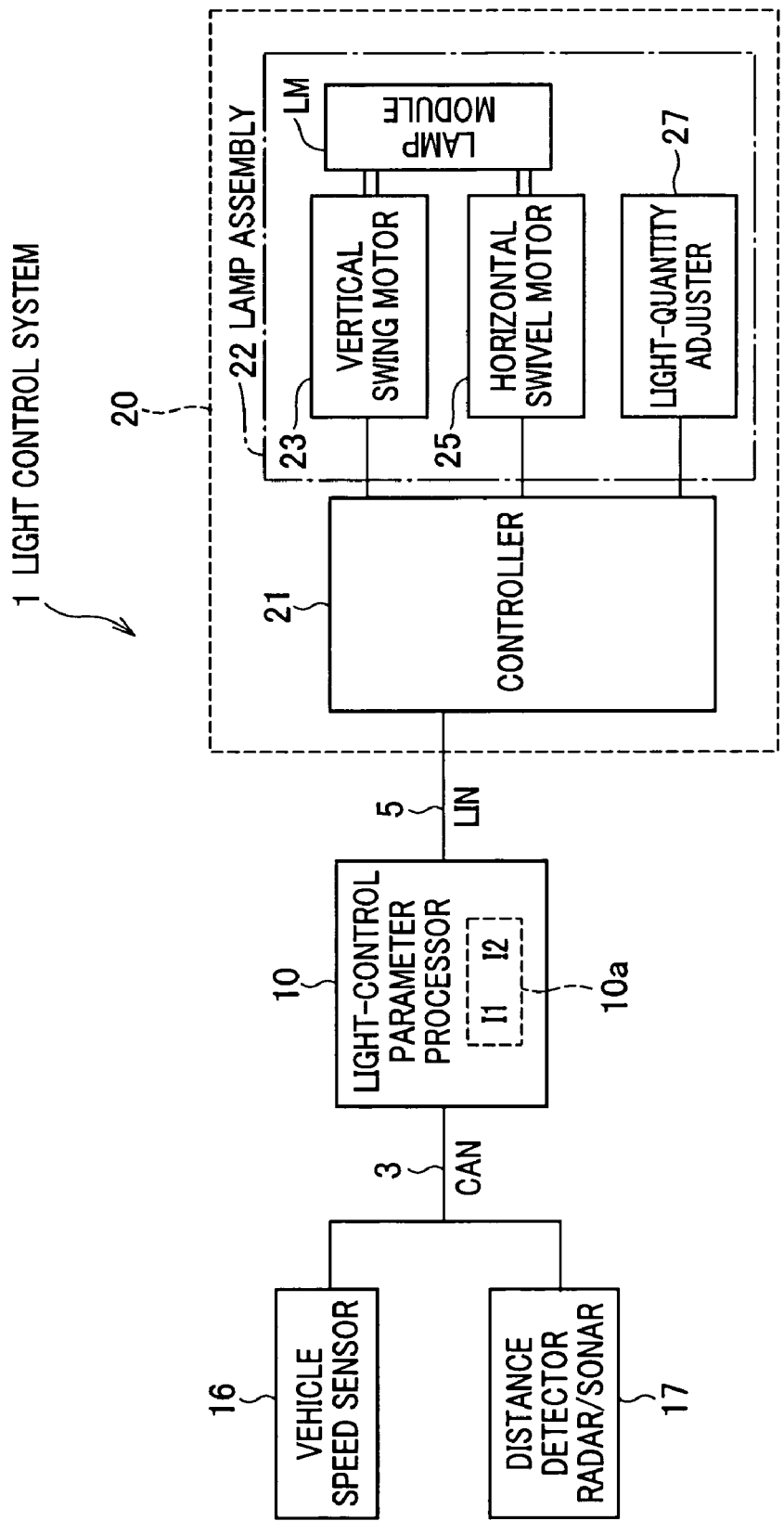
FIG. 1 is a block diagram schematically illustrating an example of the overall structure of a light control system according to a first embodiment of the present invention.

specific map information indicative of a relationship between a variable of an illumination intensity of each tail light of a preceding vehicle in ON state and that of a target percentage of light-quantity to be irradiated from each headlight in graphical format; and normal map information indicative of a relationship between the variable of the illumination intensity of each tail light of the preceding vehicle in OFF state and that of the target percentage of light-quantity to be irradiated from each headlight in graphical format.

DETAILED DESCRIPTION OF EMBODIMENTS OF THE INVENTION

Embodiments of the present invention will be described hereinafter with reference to the accompanying drawings. In the drawings, identical reference characters are utilized to identity identical corresponding components.

First Embodiment

Referring to FIG. 1, there is illustrated an example of the overall structure of a light control system 1 to which the present invention is applied. The light control system 1 is installed in a vehicle to be controlled, such as a motor vehicle.

Specifically, the light control system 1 is equipped with a light-control parameter processor 10, a vehicle speed sensor 16, and a distance detector 17 for measuring a distance between the controlled vehicle and an object, such as a preceding vehicle, located ahead of the controlled vehicle.

The light-control parameter processor 10, the vehicle speed sensor 16, and the distance detector 17 are connected to each other via, for example, a CAN (Controller area Network) bus 3. The CAN bus 3 allows the light-control parameter processor 10, the vehicle speed sensor 16) and the distance detector 17 to communicate with each other in a CAN communication protocol.

The light-control parameter processor 10 is connected to a LIN (Local Interconnect Network) bus 5, and the LIN bus 5 is connected to a pair of headlights 20. The LIN bus 5 allows the light-control parameter processor 10 and the pair of headlights 20 to communicate with each other in a LIN protocol.

The vehicle speed sensor 16 is also operative to periodically or continuously measure the speed of the controlled vehicle and to send, to the light-control parameter processor 10, a measured value of the vehicle speed in digital format (CAN format).

The distance detector 17 is designed to measure the distance between the controlled vehicle and an object ahead of the controlled vehicle by:

controlling a radar and/or a sonar to transmit radio waves and/or ultrasonic waves ahead of the controlled vehicle;

receiving echoes from at least one object based on the transmitted radio waves and/or ultrasonic waves; and measure a distance between the controlled vehicle and the at least one object based on a time interval between the transmitting timing of one of the radio waves and/or ultrasonic waves and the receiving timing of a corresponding one of the echoes.

The distance detector 17 is also operative to send, to the light-control parameter processor 10, the measured distance in digital format (CAN format).

The light-control parameter processor 10 is designed as a common microcomputer and its peripherals; this microcomputer consists of a CPU, a rewritable ROM, a RAM, and so on.

The light-control parameter processor 10 is operative to:

receive measured data sent via the CAN bus 3 from the vehicle speed sensor 16 and the distance detector 17;

store, in the RAM or the rewritable ROM, the received measured data sent from the vehicle speed sensor 16 and the distance detector 17; and execute, based on the received measured data, a headlight control task.

The headlight control task is to:

determine a first target angle to which an angle of the optical axis of each headlight 20 should be directed with respect to a first reference angle in the vertical direction orthogonal to the road surface on which the controlled vehicle is running;

determine a second target angle to which an angle of the optical axis of each headlight 20 should be directed with respect to a second reference angle in the horizontal direction orthogonal to the vertical direction; and determine a target quantity of light to be irradiated from each headlight 20.

In the first embodiment, the first reference angle represents an angle, such as 0 degrees, of the optical axis of each headlight 20 in the vertical direction when the optical axis thereof is substantially in parallel with the road surface. The second reference angle represents an angle, such as 0 degrees, of the optical axis of each headlight 20 in the horizontal direction when the optical axis thereof is substantially in parallel with or is slightly sloped inward from the direction of traveling of the controlled vehicle.

The light-control parameter processor 10 is also operative to send, to each headlight 20 via the LIN bus 5, an instruction in LIN format for causing each headlight 20 to:

direct the optical axis of each headlight 20 at both the first target angle and the second target angle; and irradiate light with the determined quantity of light.

When the optical axis of each headlight 20 is directed at both the first target angle and the second target angle, a light-distribution range (see FIGS. 2B and 2C) is determined by a light beam irradiated by each headlight 20. Specifically, adjustment of at least one of the first and second target angles of at least one headlight 20 allows the light-distribution range to be changed.

For example, the paired headlights 20 are mounted on both sides of the front end of the controlled vehicle with a predetermined interval therebetween so that their optical axes have a predetermined height with respect to the road surface. The instruction being sent from the light-control parameter processor 10 is input to each of the paired headlights 20. In FIG. 1, one of the paired headlight 20 is only illustrated for the sake of simplicity. Data indicative of the mount positions of the paired headlights 20 is previously stored in, for example, the rewritable ROM of the light-control parameter processor 10.

Each of the headlights 20 is provided with a controller 21 and a lamp assembly 22.

The lamp assembly 22 consists of a vertical swing motor 23, a horizontal swivel motor 25, and a light-quantity adjustor 27.

Figure 2A:
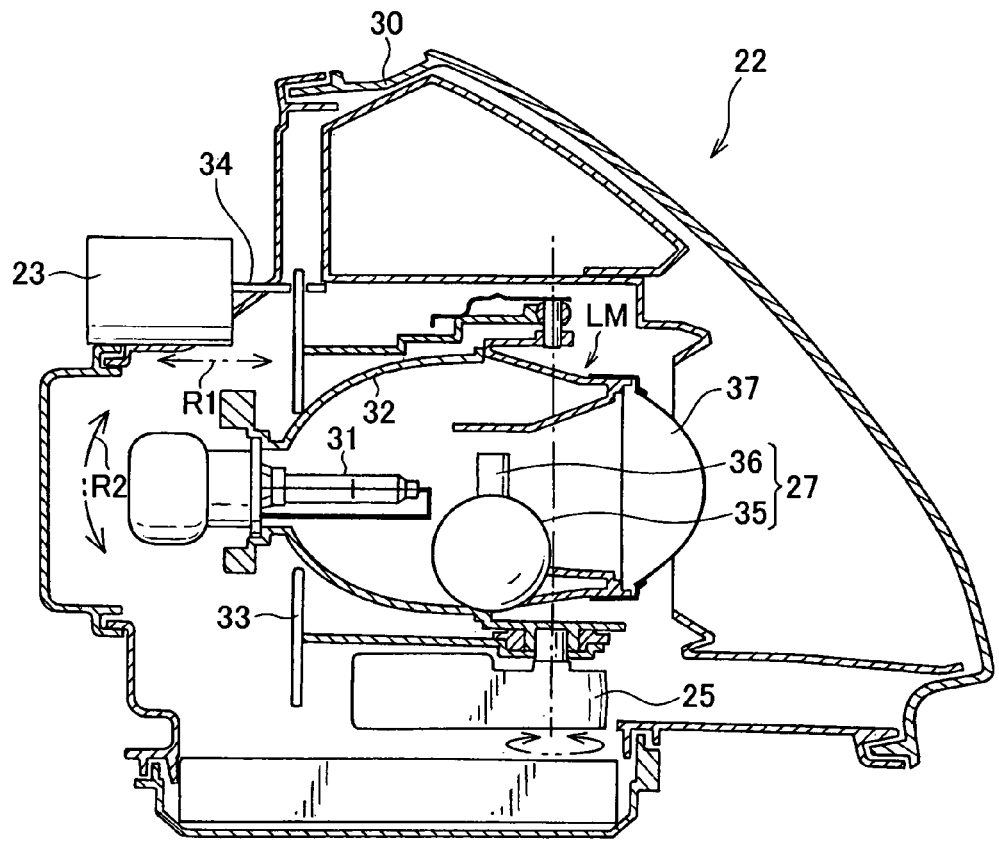
FIG. 2A is a cross-sectional view schematically illustrating an example of the structure of each headlight illustrated in FIG. 1.

In addition, as illustrated in FIG. 2A, the lamp assembly 22 also consists of a housing 30, a lamp 31, a parabolic reflector 32, a stationary support member 33, a movable support member 34, a lens 37, and a headlight circuit 38. The lamp 31, the parabolic reflector 32, the stationary support member 33, the movable support member 34, the lens 37, the headlight circuit 38, and the vertical swing motor 23 are integrated with each other to form a lamp module LM, and the lamp module LM is installed in the housing 30.

One example of the structure of the lamp assembly 22 will be described hereinafter.

The housing 30 has a substantially cylindrical shape with one end wall and the other end wall made of a light transmission member. The housing 30 is arranged such that the other end is directed ahead of the controlled vehicle.

The parabolic reflector 32 installed in the housing 30 has an inner parabolic shape with a predetermined focus point, and is arranged such that the inner parabolic surface is opposite to the other end wall of the housing 30.

The lamp 31 is fixedly disposed at the focus point of the parabolic reflector 32, and operative to produce light with a preset intensity (luminance). The produced light is incident to the inner parabolic surface of the reflector 32. Data indicative of the preset light intensity of the lamp 31 is previously stored in the rewritable ROM of the light-control parameter processor 10.

The reflector 32 works to reflect at its inner parabolic surface the incident light so that parallel light beams are produced in alignment with a center axis of the inner parabolic surface; this center as of the inner parabolic surface of the reflector 32 corresponds to the optical axis of the lamp 31.

The lens 37 is arranged opposing the lamp 31 and the inner parabolic surface of the reflector 32 such that its optical axis is aligned with the optical axis of the lamp 31. The lens 37 works to focus and irradiate the parallel light beams via the other end of the housing 30 ahead of the controlled vehicle.

One end of the stationary support member 33 is mounted on the one end wall of the housing 30. A top portion of the outer surface of the reflector 32 is supported by the other end of the stationary support member 33 to be swingable in the vertical direction.

One end of the movable support member 34 is coupled to the vertical swing motor 23, and a higher portion of the outer surface of the reflector 32 is supported by the other end of the movable support member 34. The vertical swing motor 23 is mounted on the one end wall of the housing 30 to be integrated therewith.

The structure of the movable support member 34 and the vertical swing motor 23 allows rotation of the vertical swing motor 23 to move the movable support member 34 in the direction of traveling (see the two-dot chain linear arrow R1 in FIG. 2A). The movement of the movable support member 34 allows the reflector 32 to swing in the vertical direction via the stationary support member 33 (see the two-dot chain arc arrow R2 in FIG. 2A).

The swinging of the reflector 32 in the vertical direction permits the optical axis of a corresponding one of the headlights 20 to be changed in the vertical direction. In other words, the swinging of the reflector 32 in the vertical direction permits the parallel light beams produced by the lamp 31 and the reflector 32 to be swung in the vertical direction.

The vertical swing motor 23 is connected to the controller 21. The controller 21 is operative to control the rotation of the vertical swing motor 23 to thereby adjust the direction of the optical axis of a corresponding one of the headlights 20 in the vertical direction.

The horizontal swivel motor 25 is connected to the controller 21 and is configured to rotatably support the lamp module LM in the horizontal direction. Specifically, rotation of the horizontal swivel motor 25 under control of the controller 21 allows the lamp module LM to swivel in the horizontal direction.

The swiveling of the lamp module LM in the horizontal direction permits the direction of the optical axis of a corresponding one of the headlights 20 to be changed in the horizontal direction. In other words, the swiveling of the lamp assembly 22 in the horizontal direction permits the parallel light beams produced by the lamp 31 and the reflector 32 to be swiveled in the horizontal direction. Specifically, the horizontal swivel motor 25 serves as a swiveling mechanism.

For example, a stepping motor is used as each of the vertical swing motor 23 and the horizontal swivel motor 25 in the first embodiment. In this structure, the controller 21 works to supply, to each of the stepping motors 23 and 25, a given number of electric pulses. Each of the stepping motors 23 and 25 works to rotate by a given angle corresponding to the number of electric pulses supplied thereto.

The headlight circuit 38 is connected to a battery installed in the controlled vehicle via a headlight switch operable by, for example, the driver. The headlight circuit 38 is also connected to the headlamp 31.

When the headlight switch is switched on, the headlight circuit 38 applies, to the lamp 31, a voltage supplied from the battery so as to cause the lamp 31 to produce light. When the headlight switch is switched off, the headlight circuit 38 stops, to the lamp 31, the application of the voltage supplied from the battery so that the light is turned off.

The controller 21 is connected to the light-control parameter processor 10 via the LIN bus 5 and is designed as a common microcomputer and its peripherals; this microcomputer consists of a CPU, a rewritable ROM, a RAM, and so on.

The controller 21 is operative to rotatable drive each of the vertical swing motor 23 and the horizontal swivel motor 25 individually based on the instruction including the first and second target angles and sent from the light-control parameter processor 10.

Specifically, the controller 21 is programmed to:

compute the angular difference between an actual vertical angle of the optical axis of each of the headlights 20 relative to the first reference angle and the first target angle included in the instruction;

rotatably drive the vertical swing motor 23 so as to eliminate the computed difference therebetween;

compute the angular difference between an actual horizontal angle of the optical axis of each of the headlights 20 relative to the second reference angle and the second target angle included in the instruction; and rotatably drive the horizontal swivel motor 25 so as to eliminate the computed difference therebetween.

This allows the actual vertical and horizontal angles of the optical axis of each of the headlights 20 to be matched with the first and second target angles, respectively.

The light-quantity adjuster 27 is arranged between the lamp 31 and the lens 37 and operative to adjust the light transmission therethrough. In other words, the light-quantity adjuster 27 works to adjust what percentage of light irradiated from the lamp 31 is transmitted therethrough.

In the first embodiment, the light-quantity adjuster 27 is provided with a light-transmission adjusting member 36. The light-quantity adjuster 27 is also provided with an actuator 35 connected to the controller 21 and linked to the light-transmission adjusting member 36. The actuator 35 is operative to drive the light-transmission adjusting member 36 under control of the controller 21 to thereby adjust the light transmission through the light-transmission adjusting member 36.

More specifically, the light-transmission adjusting member 36 includes a plurality of plate-like light deflectors 39 arranged at equal intervals in alignment with the horizontal direction such that:

a center of the whole of the aligned light deflectors 39 faces the optical axis of the lamp 31 and that of the lens 37; and their major sides of the light deflectors 39 are in parallel with the vertical direction.

The light-transmission adjusting member 36 also includes a link mechanism 40 rotatably supporting each of the light deflectors 39 and linked to the actuator 35. The actuator 35 works to drive, under control of the controller 21, the link mechanism 40 to thereby rotate the plurality of light deflectors 39 while they are aligned.

Figure 2B:
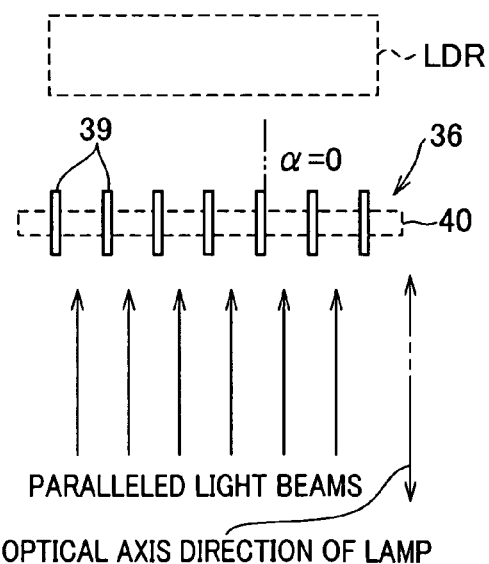
FIG. 2B is a view schematically illustrating a plurality of light deflectors of a light-transmission adjusting member illustrated in FIG. 2A.

Specifically, as illustrated in FIG. 2B, when the plurality of light deflectors 39 are rotated so that their major sides are arranged in parallel with the optical axis of the lamp 31 the paralleled light beams reflected from the reflector 32 pass through the plurality of light deflectors 39 without being blocked thereby. This allows the percentage of the light transmission through the light-transmission adjusting member 36 to substantially become 100%. The angular position of the light deflectors 39 arranged in parallel with the optic axis of the lamp 31 is set as "reference angular position" of, for example, zero degrees.

Figure 2C:
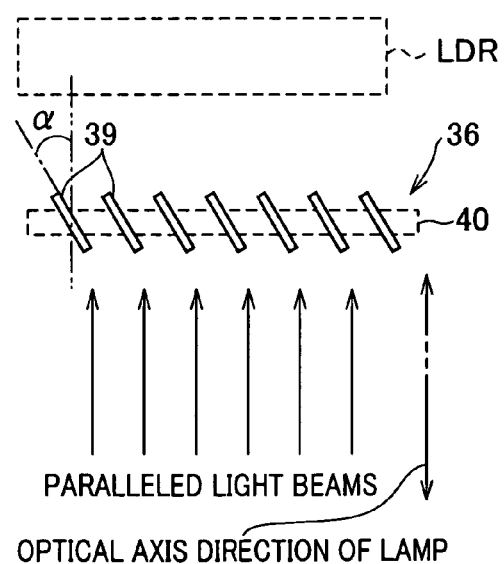
FIG. 2C is a view schematically illustrating the plurality of light deflectors of the light-transmission adjusting member illustrated in FIG. 2A.

Additionally, as illustrated in FIG. 2C, when the plurality of light deflectors 39 are rotated to be located at an angular position α so that their major sides are arranged in nonparallel with the optical axis of the lamp 31, at least part of the paralleled light beans reflected from the reflector 32 is deflected by the plurality of light deflectors 39 without non-irradiated portions being formed within the light-distribution range LDR.

This allows the percentage of the light transmission through the light-transmission adjusting member 36 to be reduced from 100% without non-irradiated portions being formed within the light-distribution range LDR.

In the first embodiment, for example, as the target quantity of light to be irradiated from each headlight 20, a target percentage of light-quantity to be irradiated from each headlight 20 relative to 100% is determined assuming that, when the target percentage becomes 100%, the paralleled light beams reflected from the reflector 32 are entirely irradiated from each headlight 20, in other words, the plurality of light deflectors 39 of each headlight 20 are located at the reference angular position (see FIG. 2B).

Specifically, the controller 21 is programmed to:

compute an actual percentage of light-quantity to be irradiated a corresponding headlight 20 based on an actual angular position α of the plurality of light deflectors 39 in accordance with, for example, a predetermined relationship between a variable of the percentage of light-quantity to be irradiated from a corresponding headlight 20 and that of the angular position α of the plurality of light deflectors 39;

compute the difference between the actual percentage of light-quantity to be irradiated from a corresponding headlight 20 and the target percentage of light to be irradiated therefrom;

convert the computed difference between the actual percentage of light-quantity to be irradiated from a corresponding headlight 20 and the target percentage of light-quantity to be irradiated therefrom into an angular deviation from the actual angular position α of the plurality of light deflectors 39; and drive the actuator 35 to rotate the plurality of light deflectors 39 so as to eliminate the computed angular deviation.

This allows the actual percentage of light-quantity to be irradiated from each headlight 20 to be matched with the target percentage of light-quantity to be irradiated therefrom.

Note that information indicative of the relationship between a variable of the percentage of light-quantity to be irradiated from each headlight 20 and that of the angular position α of the plurality of light deflectors 39 is previously determined by, for example, simulations and/or tests. The information is designed as a relational expression, a data map, or a program, and stored in, for example, the rewritable ROM.

Next, a determination of a light quantity of each headlight 20 to be executed by the light-control parameter processor 10 will be fully described hereinafter with reference to FIGS. 3 to 5. For example, at least one light-quantity determination program installed in, for example, the rewritable ROM of the light-control parameter processor 10 instructs the light-control parameter processor 10 (its CPU) to execute the determination of the light quantity of each headlight 20.

Note that the light-quantity determination program is launched first when an ignition switch of the controlled vehicle is turned on so that the engine is started. During the ignition switch being turned on, the light-quantity determination program is launched and carried out by the processor 10 every predetermined cycle.

When the light-quantity determination program is launched, the light-control parameter processor 10 receives measured data indicative of the distance between the controlled vehicle and an at least one object sent from the distance detector 17 in step S110 of FIG. 3A.

In step S110, the light-control parameter processor 10 also determines that the measured distance between the controlled vehicle and the at least one object is a parameter value of a dazzling level of the driver of a preceding vehicle based on the received measured data when it is determined that the at least one object is a preceding vehicle. Thereafter, in step S110, the light-control parameter processor 10 stores in, for example, the RAM the determined parameter value (measured distance).

Note that, in step S110, the light-control parameter processor 10 is for example programmed to determine whether the at least one object is a preceding vehicle based on whether the measured data indicative of the distance between the controlled vehicle and the at least one object sent from the distance detector 17 is within a predetermined range.

In the first embodiment, the dazzling level represents the possibility that the driver in another vehicle ahead of the controlled vehicle feels dazzling to light irradiated from the headlights 20.

Specifically, the light-control parameter processor 10 according to the first embodiment determines the dazzling level of the driver of the preceding vehicle based on the received measured distance between the controlled vehicle and the preceding vehicle, the data indicative of the mount positions of the paired headlights 20, and the data indicative of the light intensity of the lamp 31 of each headlight 20.

Because the data indicative of the mount positions of the paired headlights 20, and the data indicative of the light intensity of the lamp 31 of each headlight 20 are previously determined, the dazzling level is represented as a function of the measured distance between the controlled vehicle and the preceding vehicle.

Specifically, the shorter the measured distance between the controlled vehicle and the preceding vehicle is, the higher the dazzling level is, and the longer the measured distance between the controlled vehicle and the preceding vehicle is, the lower the dazzling level is.

After completion of the operations in step S110, the light-control parameter processor 10 computes, as a target quantity of light to be irradiated from each headlight 20, a target percentage of light-quantity to be irradiated from each headlight 20 based on the measured distance (dazzling level) in step S120.

For example, in the first embodiment, information I1 indicative of the relationship between a variable of the distance between the controlled vehicle and a preceding vehicle and that of the target percentage of light-quantity to be irradiated from each headlight 20 is previously determined by, for example, simulations and/or tests. The information I1 is designed as a relational expression, a data map, or a program, and stored in, for example, the rewritable ROM (see reference numeral 10a in FIG. 1).

Figure 4A:
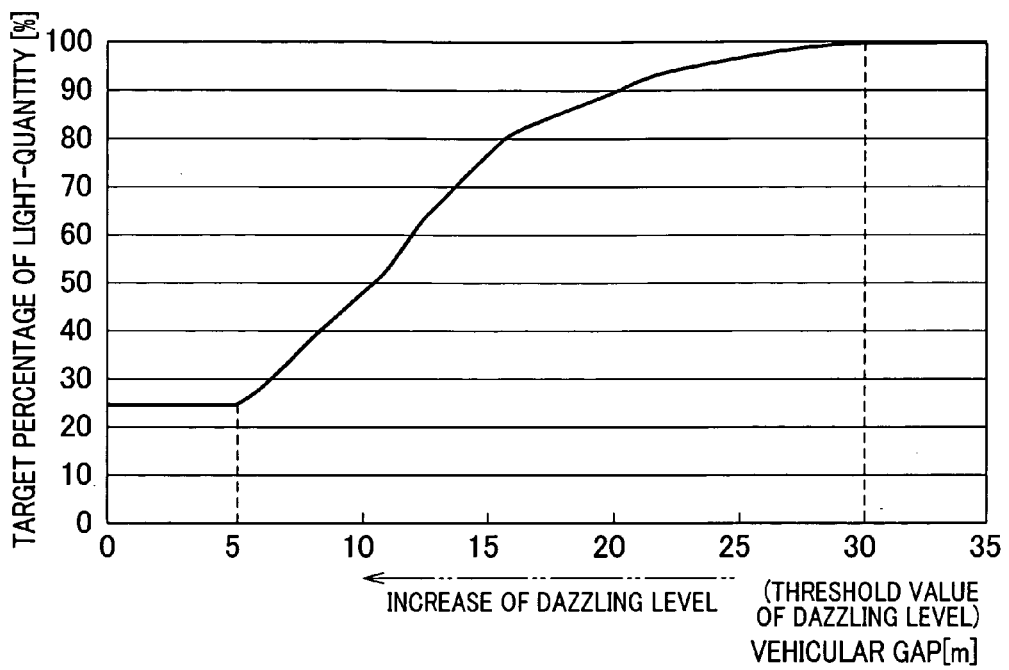
FIG. 4A is a view schematically illustrating information indicative of a relationship between a variable of a distance between a controlled vehicle and a preceding vehicle and that of a target percentage of light-quantity to be irradiated from each headlight in graphical format.

FIG. 4A schematically illustrates the information I1 indicative of the relationship between the variable of the distance between the controlled vehicle and a preceding vehicle and that of the target percentage of light-quantity to be irradiated from each headlight 20 in graphical format.

Referring to FIG. 4A, when the measured distance (vehicular gap) between the controlled vehicle and a preceding vehicle is equal to or greater than 30 m, the light-control parameter processor 10 sets, to 100%, the target percentage of light-quantity to be irradiated from each headlight 20. When the measured distance between the controlled vehicle and a preceding vehicle is changed to be reduced from 30 m, the light-control parameter processor 10 gradually reduces the target percentage of light-quantity to be irradiated from each headlight 20 with reduction in the measured distance.

When the measured distance between the controlled vehicle and a preceding vehicle is shorter than 5 m, the light-control parameter processor 10 sets, to 25%, the target percentage of light-quantity to be irradiated from each headlight 20.

In the first embodiment, the measured distance between the controlled vehicle and a preceding vehicle of 30 m represents a threshold value. Because distance between the controlled vehicle and a preceding vehicle is an inverse of dazzling level set forth above, when the measured distance between the controlled vehicle and a preceding vehicle is shorter than 30 m, the dazzling level is equal to or greater than the threshold value.

When the parameter value of the dazzling level becomes equal to or greater than 5 m, in other words, the measured distance between the controlled vehicle and the preceding vehicle becomes shorter than 5 m, the driver of the preceding vehicle is expected not to feel dazzling to the light irradiated from the headlights 20. This is because the light beam irradiated from each headlight 20 cannot be seen in the inside rearview mirror of the preceding vehicle.

Otherwise, when the parameter value of the dazzling level becomes lower than 5 m, in other words, the measured distance between the than 5 m, the driver of the preceding vehicle is expected to feel dazzling to the light irradiated from the headlights 20. This is because the light beam irradiated from each headlight 20 can be seen in the rearview mirror of the preceding vehicle.

Specifically, in step S120, the light-control parameter processor 10 references, using the measured distance as a key, the information I1 indicative of the relationship between the variable of the distance between the controlled vehicle and a preceding vehicle and that of the target percentage of light-quantity to be irradiated from each headlight 20. Based on a result of the reference, the light-control parameter processor 10 determines, as the target quantity of light to be irradiated from each headlight 20, the target percentage of light-quantity to be irradiated from each headlight 20, which corresponds to the measured distance in step S120.

Next, the light-control parameter processor 10 executes a task of determining a lower limit of a light-quantity depending on the speed of the controlled vehicle in steps S130 to S160.

Specifically, the light-control parameter processor 10 receives measured data indicative of the speed of the controlled vehicle sent from the vehicle speed sensor 16 in step S130.

In step S140, the light-control parameter processor 10 computes a lower limit of a light-quantity from each headlight 20 based on the measured speed of the controlled vehicle.

In the first embodiment, like the target quantity of light to be irradiated from each headlight 20, as the lower limit of the light-quantity from each headlight 20, a lower limit of a percentage of light-quantity to be irradiated from each headlight 20 relative to 100% is determined.

For example, in the first embodiment, information I2 indicative of the relationship between a variable of the speed of the controlled vehicle and that of the lower limit of the percentage of light-quantity to be irradiated from each headlight 20 is previously determined by, for example, simulations and/or tests. The information I2 is designed as a relational expression, a data map, or a program, and stored in, for example, the rewritable ROM (see reference numeral 10a in FIG. 1).

FIG. 43 schematically illustrates the information I2 indicative of the relationship between the variable of the speed of the controlled vehicle and that of the lower limit of the percentage of light-quantity to be irradiated from each headlight 20 in graphical format.

Referring to FIG. 4A, when the measured speed of the controlled vehicle is equal to or greater than 33 km/h, the light-control parameter processor 10 sets, to 100%, the lower limit of the percentage of light-quantity to be irradiated from each headlight 20. When the measured speed of the controlled vehicle is changed to be reduced from 33 km/h, the light-control parameter processor 10 gradually reduces the lower limit of the percentage of light-quantity to be irradiated from each headlight 20 with reduction in the measured speed of the controlled vehicle.

When the measured speed of the controlled vehicle is lower than 8 km/h, the light-control parameter processor 10 sets, to 25%, the lower limit of the percentage of light-quantity to be irradiated from each headlight 20.

Specifically, in step S140, the light-control parameter processor 10 references, using the measured speed of the controlled vehicle as a key, the information I2 indicative of the relationship between the variable of the speed of the controlled vehicle and that of the lower limit of the percentage of light-quantity to be irradiated from each headlight 20. Based on a result of the reference, the light-control parameter processor 10 determines the lower limit of the percentage of light-quantity to be irradiated from each headlight 20 in step S140.

Next, in step S150, the light-control parameter processor 10 determines whether the target percentage of light-quantity to be irradiated from each headlight 20 determined in step S120 is matched with the lower limit of the percentage of light-quantity to be irradiated from a corresponding one of the headlights 20 determined in step S140.

Upon determining that the target percentage is lower than the lower limit of the percentage (YES in step S150), the light-control parameter processor 10 proceeds to step S160.

In step S160, the light-control parameter processor 10 updates the target percentage of light-quantity to be irradiated from each headlight 20 determined in step S120 to the lower limit of the percentage of light-quantity to be irradiated from a corresponding one of the headlights 20 determined in step S140. That is, the light-control parameter processor 10 sets, as the target percentage of light-quantity to be irradiated from each headlight 20, the lower limit of the percentage of light-quantity to be irradiated from a corresponding one of the headlights 20 determined in step S140.

Thereafter, the light-control parameter processor 10 exits the lower-limit determining task, proceeding to step S170.

Otherwise, upon determining that the target percentage is equal to or greater than the lower limit of the percentage (NO in step S150), the light-control parameter processor 10 exits the lower-limit determining task, proceeding to step S170.

In step S170, the light-control parameter processor 10 sends, to the controller 21 of each headlight 20, the target percentage of light-quantity to be irradiated from each headlight 20. Thereafter, the light-control parameter processor 10 returns to step S110 and repeats the operations in steps S110 to S170 every predetermined cycle until the ignition switch is turned off.

Figure 3B:
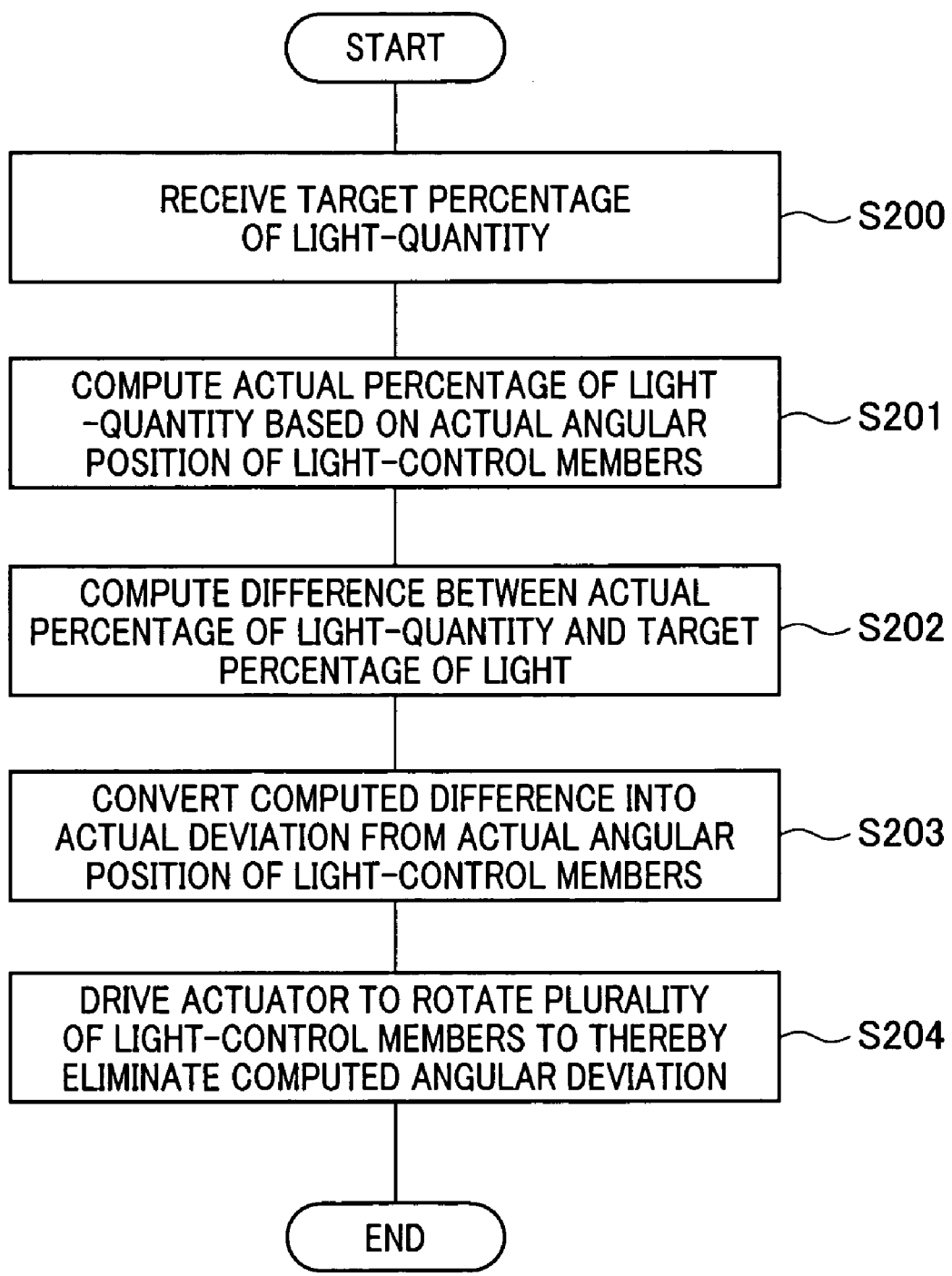
FIG. 3B is a flowchart schematically illustrating a light-quantity adjusting task to be executed by a controller of each headlight illustrated in FIG. 1.

At that time, the controller 21 of each headlight 20 receives the target percentage of light-quantity to be irradiated from a corresponding headlight 20 in step S200 of FIG. 3B.

Next, the controller 21 of each headlight 20 computes an actual percentage of light-quantity to be irradiated from a corresponding headlight 20 based on an actual angular position α of the plurality of light deflectors 39 in accordance with the predetermined relationship between the variable of the percentage of light-quantity to be irradiated from a corresponding headlight 20 and that of the angular position α of the plurality of light deflectors 39 in step S201.

Next, the controller 21 of each headlight 20 computes the difference between the actual percentage of light-quantity to be irradiated from a corresponding headlight 20 and the target percentage of light to be irradiated therefrom in step S202. Subsequently, the controller 21 converts the computed difference between the actual percentage of light-quantity to be irradiated from a corresponding headlight 20 and the target percentage of light-quantity to be irradiated therefrom into an angular deviation from the actual angular position α of the plurality of light deflectors 39 in step S203.

Thereafter, the controller 21 of each headlight 20 drives the actuator 35 to rotate the plurality of light deflectors 39 so as to eliminate the computed angular deviation in step S204.

This matches the actual percentage of light-quantity to be irradiated from each headlight 20 with the target percentage of light-quantity to be irradiated from a corresponding headlight 20. In other words, this matches the actual quantity of light to be irradiated from each headlight 20 with the target quantity of light to be irradiated form a corresponding headlight 20.

As described above, the light control system 1 according to the first embodiment is configured to measure a distance between the controlled vehicle and a preceding vehicle as the parameter value of the dazzling level of the driver of the preceding vehicle.

In addition, the light control system 1 is configured to reduce a quantity of light to be irradiated from each headlight 20 with increase in the dazzling level of the driver of the preceding vehicle.

Specifically, the light control system 1 is configured to reduce a quantity of light to be irradiated from each headlight 20 when a value of the dazzling level of the driver of the preceding vehicle is changed to increase from the threshold value.

With the configuration of the light control system 1, even if the dazzling level of the driver of the preceding vehicle increases with reduction in the measured distance between the controlled vehicle and the preceding vehicle, it is possible to reduce a quantity of light to be irradiated from each headlight 20 depending on the increase in the dazzling level. This can reduce the possibility that the driver of the preceding vehicle feels dazzling of the light irradiated from each headlight 20.

In addition, the light control system 1 according to the first embodiment is configured to reduce a quantity of light irradiated from each headlight 20 within a part or the whole of the light-distribution range LDR without forming non-irradiated portions being formed within the light-distribution range LDR.

Specifically, the light control system 1 according to the first embodiment is configured to deflect at least part of the paralleled light beams reflected from the reflector 32 without non-irradiated portions being formed within the light-distribution range LDR.

This reduces brightness differentials within the light-distribution range LDR, making it possible for the driver of the controlled vehicle to visibly identify roadside objects, such as signboards located within the light-distribution range LDR.

In particular, when the light control system 1 reduces a quantity of light irradiated from each headlight 20 within the whole of the light-distribution range LDR, brightness differentials within the light-distribution range LDR can be more reduced. This makes it possible for the driver of the controlled vehicle to more visibly identify roadside objects, such as signboards located within the light-distribution range LDR.

The light control system 1 according to the first embodiment is configured to monotonically reduce a quantity of light to be irradiated from each headlight 20 with increase in the dazzling level (with decrease in the vehicular gap). This reduces uncomfortable feeling to be provided to the driver of the controlled vehicle due to the monotonical change in a quantity of light to be irradiated from each headlight 20 as compared with a case of abruptly and significantly changing a quantity of light to be irradiated from each headlight 20.

In the first embodiment, the light control system 1 is designed to continuously reduce a quantity of light to be irradiated from each headlight 20, but can be designed to reduce, step by step, a quantity of light to be irradiated from each headlight 20. The light control system 1 can also be designed to continuously reduce a part of a quantity of light to be irradiated from each headlight 20 and reduce, step by step, another part thereof.

The light control system 1 according to the first embodiment is also designed to rotate the plurality of light deflectors 39 so as to match an actual angular position α of the plurality of light deflectors 39 with a target angular position corresponding to the target percentage of light-quantity to be irradiated from each headlight 20 computed based on the measured distance between the controlled vehicle and the preceding vehicle. This reliably adjusts an actual percentage of light-quantity to be irradiated from each headlight 20 to the target percentage of light-quantity to be irradiated therefrom. This also adjusts a quantity of light to be irradiated from each headlight 20 without changing a light intensity of a corresponding headlight 20.

The light control system 1 according to the first embodiment is further designed to:

increase the lower limit of the percentage of light-quantity to be irradiated from each headlight 20 with increase in the speed of the controlled vehicle to thereby ensure good viewability of the driver of the controlled vehicle to remote locations; and maintain, at 25%, the lower limit of the percentage of light-quantity to be irradiated from each headlight 20 when the speed of the controlled vehicle is lower than 8 km/h to thereby ensure a luminous level ahead of the controlled vehicle required for the driver of the controlled vehicle to stop the controlled vehicle or run it by a speed lower than 8 km/h.

In addition, the light control system 1 according to the first embodiment is designed to control a target percentage of light-quantity to be irradiated from each headlight 20 such that the target percentage is equal to or greater than the lower limit of the percentage of light-quantity to be irradiated from each headlight 20 adjusted based on the vehicle speed.

This prevents an actual percentage of light to be irradiated from each headlight 20 from being lower than the lower limit of light-quantity to be irradiated therefrom adjusted by the vehicle speed, making it possible to ensure a luminous level ahead of the controlled vehicle required for the driver of the controlled vehicle to run it by the vehicle speed.

Second Embodiment

Figure 5:
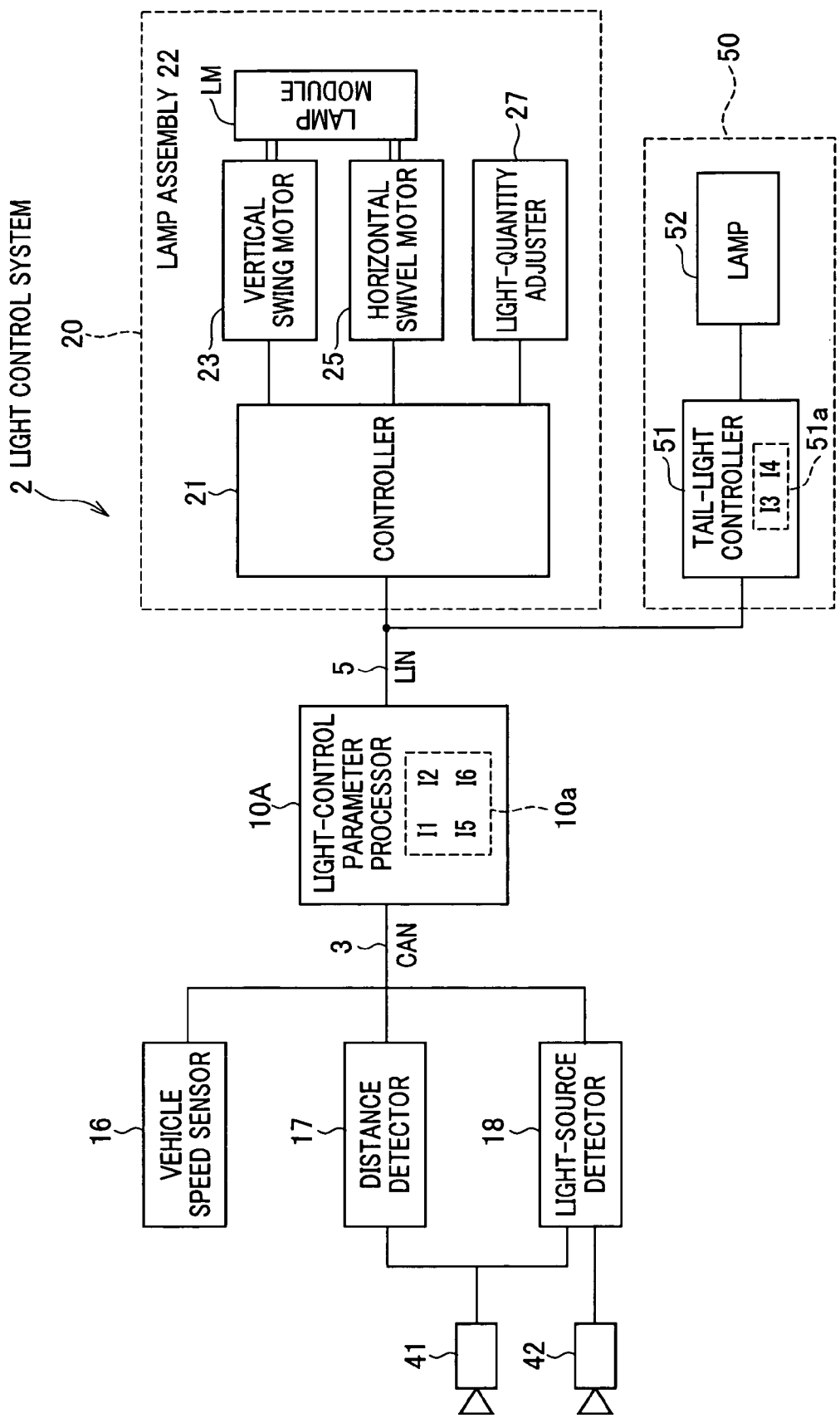
FIG. 5 is a block diagram schematically illustrating an example of the overall structure of a light control system according to a second embodiment of the present invention.

Referring to FIG. 5, there is illustrated an example of the overall structure of a light control system 2 to which the present invention is applied. Like parts between the light control systems 1 and 2 according to the first and second embodiments, to which like reference characters are assigned, are omitted or simplified in description.

In addition to the structure of the light control system 1, the light control system 2 is equipped with a light-source detector 18, a front camera module 41, and an interior camera module 42.

The LIN bus 5 of the light control system 2 is connected to a tail-light controller 51 connected to a lamp 52 of each of a pair of tail lights 50 mounted on both sides of the rear end of the controlled vehicle. The tail-light controller 51 works to control a quantity of light to be irradiated from the lamp 52 of each of the tail lights 50.

A distance detector 17a of the light control system 2 is connected to a front camera module 41 mounted on, for example, the front end of the controlled vehicle. The front camera module 41 is operative to periodically or continuously pick up a plurality of images of a predetermined region ahead of the controlled vehicle.

Specifically, the distance detector 17a is operative to periodically or continuously execute a distance detecting task by:

receiving the plurality of images picked up by the front camera module 41;

subjecting the received images to common image processing for vehicular-gap detection to thereby detect a first distance between the controlled vehicle and a preceding vehicle that the controlled vehicle follows and a second distance between the controlled vehicle and an oncoming vehicle; and sending, to a light-control parameter processor 10A, a detected value of the first distance and that of the second distance in digital format (CAN format).

For example the common image processing includes a process designed to:

find at least one headlight of an oncoming vehicle and/or at least one tail light of a preceding vehicle based on the picked-up images;

measure the location of the at least one headlight in the vertical direction and/or the location of the at least one tail lamp in the vertical direction; and determine the distance between the controlled vehicle and the oncoming vehicle based on the measured location of the at least one headlight in the vertical direction and/or the distance between the controlled vehicle and the preceding vehicle based on the measured location of the at least one tai light in the vertical direction.

The common image processing can include a process designed to:

find a pair of headlights of an oncoming vehicle and/or a pair of tail lights of a preceding vehicle based on the picked-up images ahead the controlled vehicle;

measure an interval between the paired headlights and/or an interval between the paired tail lamps; and determine the distance between the controlled vehicle and the oncoming vehicle based on the measured interval between the paired headlights and/or the distance between the controlled vehicle and the preceding vehicle based on the measured interval between the paired tail lights.

Note that the distance detector 17a can have the same configuration as that of the distance detector 17 according to the first embodiment.

The light-source detector 18 is connected to the CAN bus 3, the front camera module 41, and the interior camera module 42, and operative to periodically or continuously determine which types of light-sources correspond to light-intensity (brightness) patterns contained in at least one of the plurality of images picked up by the front camera nodule 41.

The light-source detector 18 is configured to store therein a plurality of light-intensity patterns each with a shape and a color; these light-intensity patterns can be transmitted from various types of light sources. The various types of light sources include various types of headlights for motor vehicles and motorcycles, various types of tail lights for motor vehicles and motorcycles, various types of stop lamps for motor vehicles and motorcycles, various types of lightings placed on roadsides, and so on.

Specifically, the light-source detector 18 is operative to receive the plurality of images picked up by the front camera module 41, and clip at least one area from at least one of the picked up images; each pixel of this at least one area has a light intensity higher than a predetermined threshold level. The predetermined threshold level is preset such that light intensities of the various types of light sources are higher than the predetermined threshold level.

The light-source detector 18 is also operative to compare, in shape and color, at least one light-intensity pattern contained in the clipped area with the plurality of light-intensity patterns stored therein.

As a result of the comparison, the light-source detector 18 is operative to determine the type of a light source having the at least one light-intensity pattern contained in the clipped area.

For example, when a pair of separate red points of light each with a light intensity higher than the predetermined light intensity is contained in the clipped area, the light-source detector 18 determines the pair of separate red points of light as a pair of tail lights. In addition, when a single red point of light having a light intensity higher than the predetermined light intensity and located over a middle point of such a pair of separate points is contained in the clipped area, the light-source detector 18 determines the single red point of light as a stop lamp.

The light-source detector 18 is also operative to send, to the light-control parameter processor 10A, information indicative of a determined type of a light source together with its light-intensity in response to, for example, a request sent from the light-control parameter processor 10A.

The interior camera module 42 is operative to periodically or continuously pick up a plurality of images inside the controlled vehicle; these images include face images of the driver of the controlled vehicle.

The light-source detector 18 is further operative to send, to the light-control parameter processor 10A, the plurality of images sent from the interior camera module 42.

The light-control parameter processor 10A is operative to:
receive measured data sent via the CAN bus 3 from the vehicle speed sensor 16, the distance detector 17, and the light-source detector 18;

store, in the RAM or the rewritable ROM, the received measured data sent from the vehicle speed sensor 16, the distance detector 17, and the light-source detector 18; and execute, based on the received measured data, a headlight control task identical to the headlight control task including the determination of a light quantity of each headlight 20 according to the first embodiment.

In addition, the light-control parameter processor 10A is operative to execute, based on the received measured data, a tail-light control task described hereinafter.

Like the first embodiment, the light-control parameter processor 10A is operative to send, to each headlight 20 via the LIN bus 5, an instruction in LIN format for causing each headlight 20 to:

direct the optical axis of each headlight 20 at both the first target angle and the second target angle; and irradiate light with the determined quantity of light.

In addition, the light-control parameter processor 10A is operative to send, to the tail-light controller 51 of each tail light 50 via the LIN bus 5, an instruction in LIN format for causing each tail light 50 to irradiate light with the determined quantity of light.

The lamp 52 of each tail light 50 works to irradiate with a light intensity depending on a voltage applied from the tail-light controller 51.

The tail-light controller 51 is designed as, for example, a common microcomputer and its peripherals; this microcomputer consists of a CPU, a rewritable ROM, a RAM, and so on.

The tail-light controller 51 is operative to:
receive the instruction sent from the light-control parameter processor 10A;

determine a value of the voltage to be applied to the lamp 52 based on a predetermined relationship between a variable of the light intensity to be irradiated from the lamp 52 and that of the voltage to be applied thereto; and apply the determined value of the voltage to the lamp 52 to thereby cause the lamp 52 to irradiate light with a value of the light intensity corresponding to the applied voltage.

Information I3 indicative of the predetermined relationship between a variable of the light intensity to be irradiated from the lamp 52 and that of the voltage to be applied thereto is designed as a relational expression, a data map, or a program, and stored in, for example, the rewritable ROM (see 51a in FIG. 5).

Next, the tail-light control task to be executed by the tail-light controller 51 will be fully described hereinafter with reference to FIGS. 6 to 9. For example, at least one tail-light control program installed in, for example, the rewritable ROM of the light-control parameter processor 10A instructs the light-control parameter processor 10A (its CPU) to execute the tail-light control task.

In the second embodiment, the tail-light control task is launched and carted out by the processor 10A every predetermined cycle.

When the tail-light control program is launched, the light-control parameter processor 10A receives a face image picked up by the interior camera module 42 and sent therefrom via the light-source detector 18 in step S210 of FIG. 6A.

Next, the light-control parameter processor 10A computes a contrast ratio between, for example, a light intensity at a point in an area of the face image around his/her eyes and a light intensity at a point in the remaining area of the face image in step S220.

Figure 7:
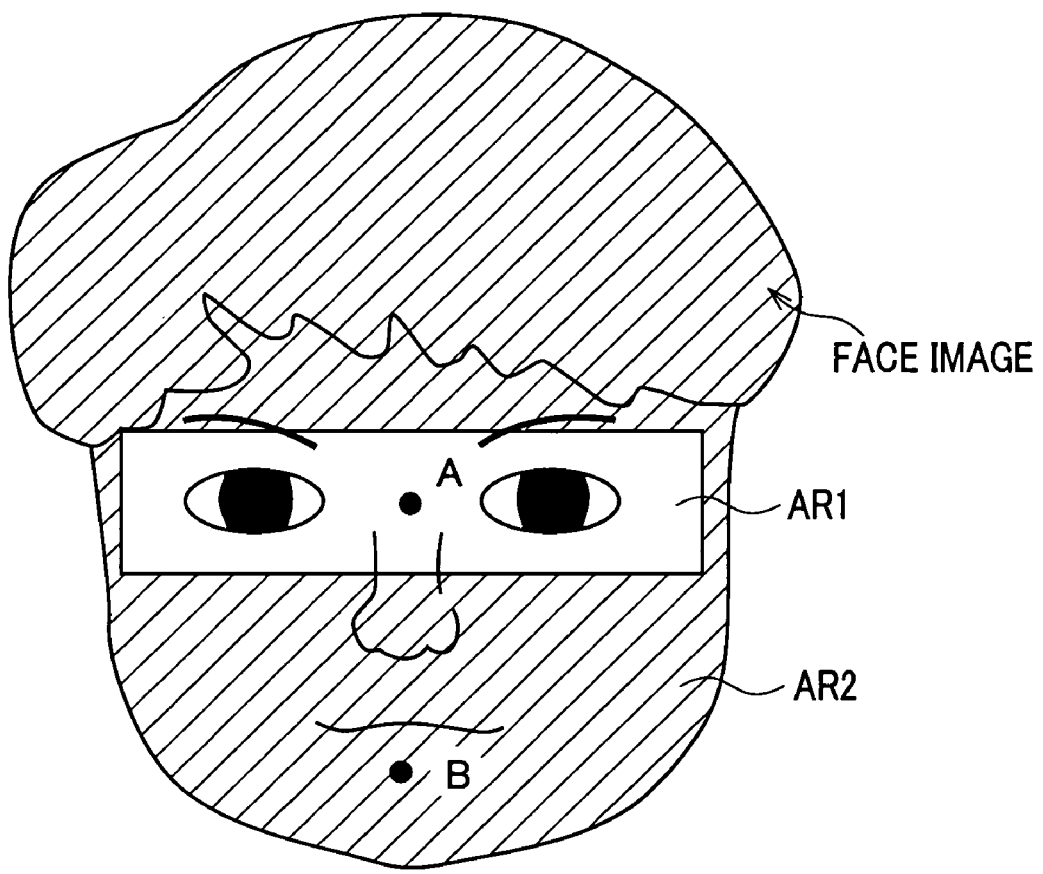
FIG. 7 is a view schematically illustrating a face image picked up by an interior camera module illustrated in FIG. 5.

Specifically, referring to FIG. 7, the light-control parameter processor 10A computes a light intensity at a point in an area AR1 of the face image on which light reflected from the inside rearview mirror of the controlled vehicle and outputted from a vehicle following the controlled vehicle is irradiated. The light-control parameter processor 10A computes a light intensity at a point, such as a point B, in the remaining area AR2 of the face image on which no light reflected from the inside rearview mirror of the controlled vehicle is irradiated in step S220.

For example, as an example of a point in the area AR1, a point A located between the eyes of the driver of the controlled vehicle is used, and, as an example of a point in the area AR2, a point B located downwardly away from the point A by a preset distance, such as 10 cm, equal to or greater than the vertical width of the inside rearview mirror.

Next, the light-control parameter processor 10A determines whether the computed contrast ratio is equal to or greater than a preset threshold ratio of, for example, "1" in step S230.

Upon determining that the computed contrast ratio is less than the preset threshold ratio (NO in step S230), the light-control parameter processor 10A exits the tail-light control task.

Otherwise, upon determining that the computed contrast ratio is equal to or greater than the preset threshold ratio YES in step S230), the light-control parameter processor 10A sends, to the tail-light controller 51, an instruction for causing the tail-light controller 51 to increase a preset normal level of light intensity to be irradiated from the lamp 52 by a predetermined level in step S240. Thereafter, the light-control parameter processor 10A terminates the tail-light control task.

Specifically, in the second embodiment, information I4 indicative of the relationship between a variable of the contrast ratio and that of the light intensity (quant of light) to be irradiated from each tai light 50 is previously determined by, for example, simulations and/or tests. The information I4 is designed as a relational expression, a data map, or a program, and stored in, for example, the rewritable ROM (see reference numeral 51a in FIG. 5).

Figure 8A:
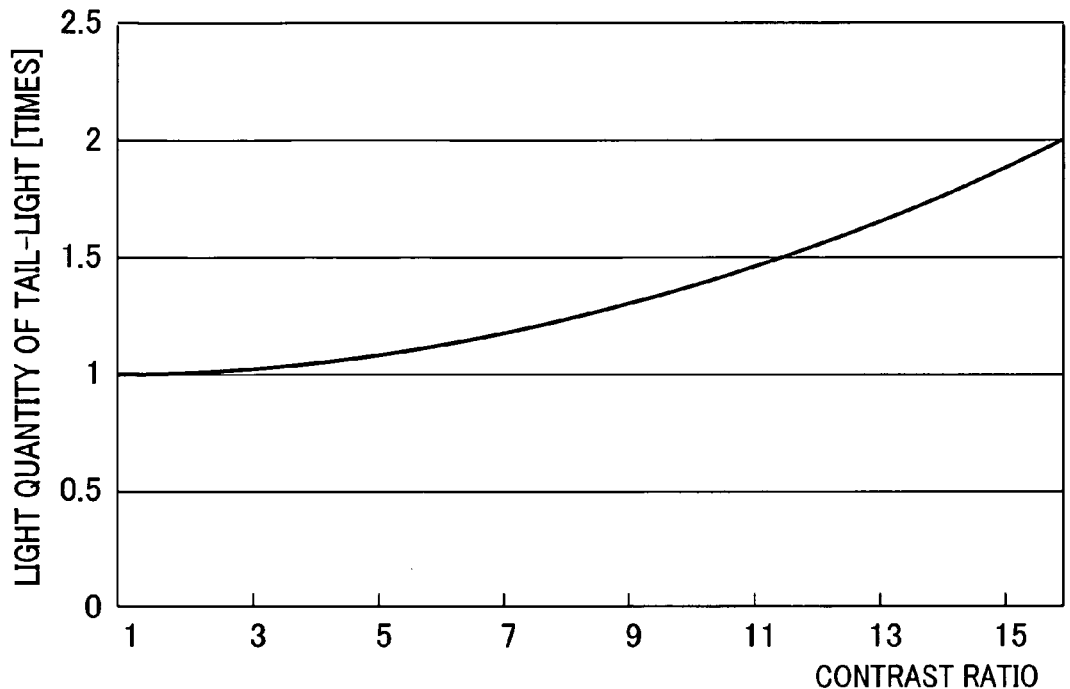
FIG. 8A is a view schematically illustrating information indicative of a relationship between a variable of a contrast ratio and that of a light intensity to be irradiated from each tail light illustrated in FIG. 5 in graphical format.

FIG. 8A schematically illustrates the information I4 indicative of the relationship between a variable of the contrast ratio and that of the light intensity (quantity of light) to be irradiated from each tail light 50 in graphical format.

Referring to FIG. 5A, when the computed value of the contrast ratio is less than the preset threshold ratio of "1", the light intensity to be irradiated from the lamp 52 is set to the normal level.

When the computed value of the contrast ratio is changed to be increased from the preset threshold ratio of "1", the light-control parameter processor 10A sends, to the tai-light controller 51, an instruction for causing the tail-light controller 51 to gradually increase the light intensity to be irradiated from the lamp 52 from the normal level in step S240.

When the computed value of the contrast ratio reaches "15.5", the light-control parameter processor 10A sends, to the tail-light controller 51, an instruction for causing the tail-light controller 51 to set a level of the light intensity to be irradiated from the lamp 52 so that the set level is twice the normal level in step S240.

Next, a determination of a light quantity of each headlight 20 to be executed by the light-control parameter processor 10A will be fully described hereinafter with reference to FIGS. 6B and 8B. For example, at least one light-quantity determination program installed in, for example, the rewritable ROM of the light-control parameter processor 10A instructs the light-control parameter processor 10A (its CPU) to execute the determination of the light quantity of each headlight 20.

Note that the light-quantity determination program is launched first when an ignition switch of the controlled vehicle is turned on so that the engine is started. During the ignition switch being turned on, the light-quantity determination program is launched and carried out by the processor 10A every predetermined cycle.

When the light-quantity determination program is launched, the light-control parameter processor 10A receives, from the light-source detector 18, information indicative of a pair of tail lights as a determined type of a light source together with their light-intensities and that indicative of a stop lamp as a determined type of a light source together with its light-intensity in step S310 of FIG. 6B. Next, the light-control parameter processor 10A extracts the light intensities of the pair of tail lights included in the received information in step S320.

Specifically, the light-control parameter processor 10A according to the second embodiment determines the dazzling level of the driver of a preceding vehicle based on the extracted light intensities of the pair of tail lights of the preceding vehicle.

More specifically, the higher the sampled light intensities of the pair of tail lights are, the higher a possibility that a distance between the controlled vehicle and the preceding vehicle is short is, and the lower the sampled light intensities of the pair of tail lights are, the higher a possibility that the distance between the controlled vehicle and the preceding vehicle is long is.

As described in the first embodiment, the shorter the distance between the controlled vehicle and the preceding vehicle is, the higher the dazzling level is, and the longer the distance between the controlled vehicle and the preceding vehicle is, the lower the dazzling level is. The light-control parameter processor 10A is configured to compute the dazzling level of the driver of the preceding vehicle based on the characteristic set fort above.

In addition, if the light control system 2 is installed in the preceding vehicle and operative to carry out the tail-light control task illustrated in FIG. 6A, a quantity of light to be irradiated from each tail light of the preceding vehicle can be controlled depending on the dazzling level of the driver of the preceding vehicle. For this reason, the light-control parameter processor 10A of the light control system 2 installed in the controlled vehicle can directly measure the dazzling level of the driver of the preceding vehicle.

Note that, in the second embodiment, the extracted light intensities of the pair of tail lights are not directly used, but illumination intensities converted from the extracted light intensities are used.

Next, the light-control parameter processor 10A determines whether the stop lamp of the preceding vehicle is being lit based on the received information associated with the stop lamp in step S330.

Upon determining that the stop lamp of the preceding vehicle is being lit (YES in step S330), the light-control parameter processor 10A uses specific information I5 to determine a target percentage of light to be irradiated from each headlight 20 in step S340, and thereafter, going to step S360.

Otherwise, upon determining that the stop lamp of the preceding vehicle is not being lit (NO in step S330), the light-control parameter processor 10A uses normal information I6 to determine a target percentage of light to be irradiated from each headlight 20 in step S350, and thereafter, going to step S360.

For example, in the second embodiment, the specific information I5 indicative of the relationship between a variable of the illumination intensity of each tail light of the preceding vehicle in ON state and that of the target percentage of light-quantity to be irradiated from each headlight 20 is previously determined by, for example, simulations and/or tests. The information I5 is designed as, for example, a data map and stored in, for example, the rewritable ROM (see reference numeral 10a in FIG. 5).

In addition, in the second embodiment the normal information I6 indicative of the relationship between a variable of the illumination intensity of each tail light of the preceding vehicle in OFF state and that of the target percentage of light-quantity to be irradiated from each headlight 20 is previously determined by, for example, simulations and/or tests. The information I6 is designed as, for example, a data map and stored in, for example, the rewritable ROM (see reference numeral 10a in FIG. 5).

Figure 8B:
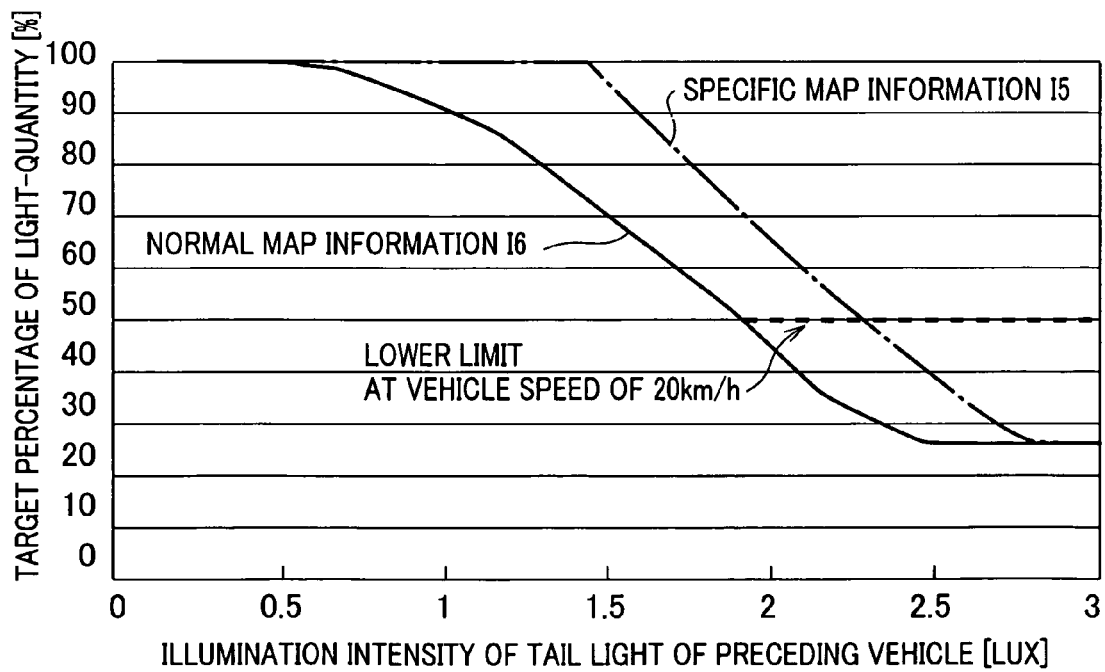
FIG. 8B schematically illustrates.

FIG. 8B schematically illustrates the specific map information I5 indicative of the relationship between the variable of the illumination intensity of each lighting tai light of the preceding vehicle and that of the target percentage of light-quantity to be irradiated from each headlight 20 in graphical format. FIG. 8B also schematically illustrates the normal map information I6 indicative of the relationship between the variable of the illumination intensity of each light-out tail light of the preceding vehicle and that of the target percentage of light-quantity to be irradiated from each headlight 20 in graphical format.

In using the normal map information I6 illustrated in FIG. 8B, when a value of the illumination intensity of each tail light is changed to be increased from 0.5 lux, the light-control parameter processor 10A gradually reduces the target percentage of light-quantity to be irradiated from each headlight 20 from 100% with reduction in the illumination intensity of each tail light.

When a value of the illumination intensity of each tail light is equal to or greater than 2.5 lux, the light-control parameter processor 10A sets, to 25%, the target percentage of light-quantity to be irradiated from each headlight 20.

On the other hand, in using the special map information I5 illustrated in FIG. 8B, when a value of the illumination intensity of each tail light is changed to be increased from 1.5 lux, the light-control parameter processor 10A gradually reduces the target percentage of light-quantity to be irradiated from each headlight 20 from 100% with reduction in the illumination intensity of each tail light.

When a value of the illumination intensity of each tail light is equal to or greater than 3.0 lux, the light-control parameter processor 10A sets, to 25%, the target percentage of light-quantity to be irradiated from each headlight 20.

Specifically, when a brake system of the preceding vehicle is being operated so that the stop lamp is being lit, a quantity of light to be irradiated from each tail light increases. For this reason, in order to avoid excessive reduction in a quantity of light to be irradiated from each headlight 20 of the controlled vehicle relative to the illumination intensity of each tail light of the preceding vehicle, the light-control parameter processor 10A uses the special map information I5 in place of the normal map information I16.

Note that, in place of the specific information I5, specific information indicative of the relationship between a variable of the light intensity of each lighting tail light of the preceding vehicle and that of the target percentage of light-quantity to be irradiated from each headlight 20 can be used. Similarly, in place of the normal information I6, normal information indicative of the relationship between a variable of the light intensity of each light-out tail light of the preceding vehicle and that of the target percentage of light-quantity to be irradiated from each headlight 20 can be used.

After completion of the operation in step S340 or S350, the light-control parameter processor 10A executes a task of determining a lower limit of a light-quantity depending on the speed of the controlled vehicle in step S360; this task is similar to the task illustrated in steps S130 to S160 of FIG. 3A.

Figure 4B:
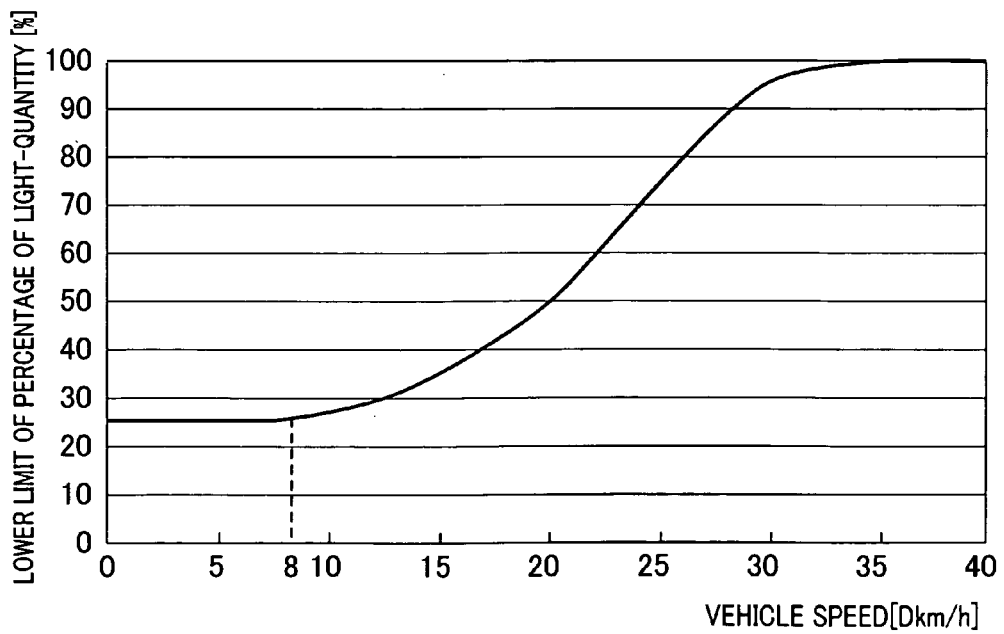
FIG. 4B is a view schematically illustrating information indicative of a relationship between a variable of a speed of the controlled vehicle and that of a lower limit of a percentage of light-quantity to be irradiated from each headlight in graphical format.

Specifically, as illustrated in FIGS. 4B and 8B, when the measured speed of the controlled vehicle is 20 km/h, the light-control parameter processor 10A sets, to 50%, the lower limit of the percentage of light-quantity to be irradiated from each headlight 20 independently of the illumination intensity of each tail light of the preceding vehicle (see steps S130 to S160 in FIG. 3A).

Thereafter, the light-control parameter processor 10A sends, to the controller 21 of each headlight 20, the target percentage of light-quantity to be irradiated from each headlight 20 in step S370. Thereafter, the light-control parameter processor 10A returns to step S310 and repeats the operations in steps S310 to S370 ever predetermined cycle until the ignition switch is turned off.

At that time, the controller 21 of each headlight 20 executes the operations in steps S200 to S204 of FIG. 3B to thereby match the actual percentage of light-quantity to be irradiated from each headlight 20 with the target percentage of light-quantity to be irradiated from a corresponding headlight 20.

As described above, the light control system 2 according to the second embodiment is configured to measure the light intensities of the pair of tail lights of a preceding vehicle extracted by the light-source detector 18 as a parameter value of a dazzling level of the driver of the preceding vehicle.

The light control system is also configured to determine the dazzling level of the driver of the preceding vehicle based on the measured light intensities (illumination intensities) of the pair of tail lights of the preceding vehicle.

With the configuration of the light control system 2, it is possible to reliably determine the dazzling level of the driver of the preceding vehicle.

The light control system 2 is also configured to increase a threshold value of the dazzling level when the stop lamp of the preceding vehicle is detected by the light-source detector 18.

Specifically, when the stop lamp of the preceding vehicle is detected by the light-source detector 18, the light control system 2 changes a timing when the target percentage of light-quantity to be irradiated from each headlight 20 is reduced from 100% from 0.5 lux of the illumination intensity of each tail light of preceding vehicle to 1.5 lux thereof.

Thus, even if the brake system of the preceding vehicle is operated so that the light intensities of die pair of tail lights are increased, it is possible to avoid excessive reduction in a quantity of light to be irradiated from each headlight 20.

The light control system 2 is further configured to:
determine whether the driver of the controlled vehicle feels dazzling to the headlights of the following vehicle based on the face image of the driver; and
inform the driver of the following vehicle of a result of the determination indicative of the driver of the controlled vehicle feeling dazzling.

With the configuration of the light control system 2, it is possible to prompt the driver of the following vehicle to change the optical axis of each headlight to be dimmed (dipped).

In the second embodiment, as a method of informing the driver of the following vehicle of the fact that the driver of the controlled vehicle feels dazzling, the light control system 2 uses a method of increasing the light intensity of each tail light of the controlled vehicle.

This makes it possible to inform the driver of the following vehicle of the fact that the driver of the controlled vehicle feels dazing with a simple structure. If the light control system 2 is installed in the following vehicle, it is possible to cause the light control system 2 installed in the following vehicle to reduce a quantity of light to be irradiated from each headlight of the following vehicle based on the light intensity of each tail light of the controlled vehicle.

The light control system 2 is configured to check whether light reflected from the inside rearview mirror is irradiated on an area of the face image around the driver's eyes and determine whether the driver of the controlled vehicle feels dazzling to light irradiated from the headlights of the following vehicle based on a result of the check.

Specifically, the light control system 2 is configured to compute a contrast ratio between, for example, a light intensity at a point in an area of the face image around his/her eyes and a light intensity at a point in the remaining area of the face image and to determine whether the driver of the controlled vehicle feels dazzling to light irradiated from the headlights of the following vehicle based on the computed contrast ratio.

Thus, it is possible to reliably determine whether the driver of the controlled vehicle feels dazzling to light irradiated from the headlights of the following vehicle.

The present invention is not limited to the first and second embodiments and can be modified within the scope thereof.

For example, in place of the light-transmission adjusting member 36, a member, such as liquid crystal projector, designed to adjust a light transmission therethrough can be used.

In addition, the light-quantity adjuster 27b can be designed to adjust an intensity of light to be irradiated from each headlight 20. This reliably reduce a quantity of light to be irradiated from each headlight 20. Moreover, in addition to the light-transmission adjusting member 36, a member designed to adjust an intensity of light to be irradiated from each headlight 20 can be used. This explicitly adjusts a quantity of light to be irradiated from each headlight 20.

In the second embodiment, in place of increasing the light intensities of the pair of tail lights in order to inform the driver of the following vehicle of the fact that the driver of the controlled vehicle feels dazzling, the light control system 2 can be configured to inform the driver of the following vehicle of the fact that the driver of the controlled vehicle feels dazzling using inter-vehicle communications. In this modification, in place of the operation in step S320, the light control system 2 of the controlled vehicle can receive information indicative of the fact that the driver of the preceding vehicle feels dazzling, and determine a target percentage of light to be irradiated from each headlight 20 in step S340 or S360 in response to receiving the information.

In the first embodiment, as a parameter value (measureable quantity) of the dazzling level of a preceding vehicle, a distance between the controlled vehicle and a preceding vehicle is used. Similarly, in the second embodiment, as a parameter value (measureable quantity) of the dazzling level of a preceding vehicle, light intensities of a pair of tail lights of a preceding vehicle are used. The present invention is however not limited to the parameter values.

Specifically, a parameter value associated with a relative positional relationship between the controlled vehicle and a preceding vehicle can be used as a parameter value of the dazzling level of the driver of the preceding vehicle.

In each of the first and second embodiments, as another vehicle ahead of the controlled vehicle, a preceding vehicle is used, but an oncoming vehicle can be used as another vehicle ahead of the controlled vehicle.

In each of the first and second embodiments, the light-control parameter processor 10, 10A and the controller 21 of each headlight 20 are separated from each other, but the present invention is not limited to the structure.

Specifically, the light-control parameter processor 10, 10A can be designed to carry out all operations of the controller 21 of each headlight 20 to thereby omit the controller 21 therefrom. In addition, the controller 21 of at least one of the headlights 20 can be designed to carry out all operations of the light-control parameter processor 10, 10A to thereby omit the light-control parameter processor 10, 10A from the light control system.

While there has been described what is at present considered to be the embodiments and its modifications of the present invention, it will be understood that various modifications which are not described yet may be made therein, and it is intended to cover in the appended claims all such modifications as fall within the true spirit and scope of the invention.

What is claimed is:

1. A system for controlling a headlight of a vehicle being controlled, the system comprising:
    a detector configured to provide a parameter value of a dazzling level of a driver of an other vehicle ahead of the controlled vehicle based on information associated with a relative positional relationship between the controlled vehicle and the other vehicle, the dazzling level representing a possibility that the driver of the other vehicle feels dazzling from light irradiated from the headlight of the controlled vehicle;
    a speed sensor configured to measure a speed of the controlled vehicle;
    a processor configured to determine a target light quantity based on the parameter value, the processor further configured to determine a lower limit of the quantity of light to be irradiated from the headlight of the controlled vehicle based on the measured speed of the controlled vehicle, wherein the processor selects the higher of the target quantity and lower limit; and
    a light quantity adjuster configured to adjust the quantity of light irradiated from the headlight of the controlled vehicle based on the processor's selection.

2. A system according to claim 1, wherein the light-quantity adjuster is configured to reduce the quantity of light irradiated from the headlight of the controlled vehicle when the determined parameter value of the dazzling level is changed to increase from a preset threshold value.

3. A system according to claim 1, wherein the light-quantity adjuster is configured to monotonically reduce the quantity of light irradiated from the headlight of the controlled vehicle with increase in the determined parameter value of the dazzling level.

4. A system according to claim 1, wherein the light-quantity adjuster comprises:
    a lamp configured to output light; and
    a light-transmission adjusting member arranged opposing the lamp and having a movable portion, movement of the movable portion allowing a light transmission of the light-transmission adjusting member to be changed, the light-transmission adjusting member being configured to move the movable portion by an amount of movement to thereby change transmission therethrough with respect to the light outputted from the lamp, the amount of movement being determined based on the determined parameter value of the dazzling level.

5. A system according to claim 1, wherein the detector comprises a distance detector configured to measure a distance between the controlled vehicle and the other vehicle as the information associated with the relative positional relationship between the controlled vehicle and the other vehicle, which becomes the parameter value.

6. A system according to claim 1, wherein the other vehicle is a preceding vehicle that the controlled vehicle follows, the detector comprises:
    a first image pickup unit configured to pick up a plurality of images ahead of the controlled vehicle; and
    a taillight detecting unit configured to detect, as the information associated with the relative positional relationship between the controlled vehicle and the other vehicle, a light intensity pattern of a tail light of the preceding vehicle based on the plurality of picked-up images,
    the detector providing the parameter value of the dazzling level of the driver of the preceding vehicle based on the detected light intensity pattern of the tail light of the preceding vehicle.

7. A system according to claim 6, further comprising:
    a stop lamp detecting unit configured to detect a light intensity pattern of a stop lamp of the preceding vehicle based on the plurality of picked-up images,
    wherein the light-quantity adjuster is configured to:
    reduce the quantity of light irradiated from the headlight of the controlled vehicle when the determined parameter value of the dazzling level is changed to increase from a preset threshold value; and
    increase the preset threshold value at a moment when the light intensity pattern of the stop lamp is detected by the stop lamp detecting unit.

8. A system according to claim 1: further comprising:
    a dazzling determiner configured to determine whether a driver of the controlled vehicle feels dazzling from a light irradiated from a headlight of a following vehicle; and
    an informing unit configured to, when it is determined that the driver of the controlled vehicle feels dazzling from the light irradiated from the headlight of the following vehicle, inform the following vehicle of dazzling information indicative of the fact that the driver of the controlled vehicle feels dazzling.

9. A system according to claim 8, wherein the informing unit is configured to increase an intensity of light irradiated form a tail light of the controlled vehicle to thereby inform the following vehicle of the dazzling information.

10. A system according to claim 9, wherein the dazzling determiner comprises an image pickup unit configured to pick up a face image of the driver of the controlled vehicle, the dazzling determiner being configured to carry out:
    a first determination of whether light reflected from an inside rearview mirror of the controlled vehicle is irradiated on an area of the face image around the driver's eyes; and a second determination whether the driver of the controlled vehicle feels dazzling from the light irradiated from the headlight of the following vehicle based on a result of the first determination.

11. A system according to claim 10, wherein the dazzling determiner is configured to:
    measure a contrast ratio between a light intensity of at least one point in the area of the face image around the driver's eyes and a light intensity of at least one point in the remaining area of the face image; and
    carry out the second determination based on the measured contrast ratio.

12. A system according to claim 1, farther comprising:
    a storing unit configured to store therein a relationship between the parameter value of the dazzling level and the target light quantity to be irradiated from the headlight of the controlled vehicle,
    wherein the processor is configured to determine, the target light quantity based on the relationship stored in the storing unit.

13. A method of providing control of a headlight of a controlled vehicle, the method comprising:
    determining a parameter value of a dazzling level of a driver of an other vehicle ahead of the controlled vehicle based on information associated with a relative positional relationship between the controlled vehicle and the other vehicle, the dazzling level representing a possibility that the driver of the other vehicle feels dazzling from light irradiated from the headlight of the controlled vehicle;
    computing a target quantity of light to be irradiated from the controlled headlight based on the parameter value;
    measuring a speed of the controlled vehicle;
    computing a lower limit of light quantity to be irradiated from the controlled headlight based on the measured speed;
    selecting the higher quantity between the target and the lower limit; and
    adjusting the quantity of light irradiated from the headlight of the controlled vehicle based on the selected quantity.

14. A method according to claim 13, wherein the step of adjusting the quantity of light includes reducing the quantity of light irradiated from the headlight of the controlled vehicle when the determined parameter value of the dazzling level is changed to increase from a preset threshold value.

15. A method according to claim 13, wherein the step of adjusting the quantity of light includes monotonically reducing the quantity of light irradiated from the headlight of the controlled vehicle with increase in the determined parameter value of the dazzling level.

16. A method according to claim 13 wherein the step of adjusting the quantity of light comprises:
    providing a lamp configured to output light; and
    providing a light-transmission adjusting member arranged opposing the lamp and having a movable portion, movement of the movable portion allowing a light transmission of the light-transmission adjusting member to be changed, the light-transmission adjusting member being configured to move the movable portion by an amount of movement to thereby change transmission therethrough with respect to the light outputted from the lamp, the amount of movement being determined based on the determined parameter value of the dazzling level.

17. A method according to claim 13, wherein the step of determining the parameter value of the dazzling level includes measuring a distance between the controlled vehicle and the other vehicle as the information associated with the relative positional relationship between the controlled vehicle and the other vehicle.

18. A method according to claim 13, wherein the other vehicle is a preceding vehicle that the controlled vehicle follows, and the step of determining the parameter value of the dazzling level comprises:
    picking up a plurality of images ahead of the controlled vehicle;
    detecting, as the information associated with the relative positional relationship between the controlled vehicle and the other vehicle, a light intensity pattern of a tail light of the preceding vehicle based on the plurality of picked-up images; and
    determining the parameter value of the dazzling level of the driver of the preceding vehicle based on the detected light intensity pattern of the tail light of the preceding vehicle.

19. A method according to claim 13, further comprising:
    determining whether a driver of the controlled vehicle feels dazzling to from a light irradiated from a headlight of a following vehicle; and
    when it is determined that the driver of the controlled vehicle feels dazzling from the light irradiated from the headlight of the following vehicle, informing the following vehicle of dazzling information indicative of the fact that the driver of the controlled vehicle feels dazzling.

20. A method according to claim 13, further comprising:
    storing, in a storage unit, a relationship between the parameter value of the dazzling level and the target light quantity to be irradiated from the headlight of the controlled vehicle,
    wherein the step of computing the target value includes determining the target value based on the relationship stored in the storing unit.

* * * * *